United States Patent [19]
Baker

[11] Patent Number: 4,781,426
[45] Date of Patent: Nov. 1, 1988

[54] OPTICAL FIBER COLLIMATOR/SWITCH INCLUDING LIQUID CRYSTAL POLARIZING MATERIAL

[75] Inventor: Anthony P. Baker, New York, N.Y.

[73] Assignee: ITT Defense Communications, a division of ITT Corporation, Nutley, N.J.

[21] Appl. No.: 913,874

[22] Filed: Sep. 30, 1986

[51] Int. Cl.⁴ .......................... G02B 6/28; G02F 1/13
[52] U.S. Cl. ................... 350/96.16; 350/96.15; 350/96.20; 350/96.21; 350/331 R; 350/347 V; 350/352
[58] Field of Search ............. 350/96.10, 96.15, 96.16, 350/96.18, 96.19, 96.20, 96.21, 337, 338, 352, 347 R, 347 V, 374

[56] References Cited

U.S. PATENT DOCUMENTS

| | | | |
|---|---|---|---|
| 3,980,395 | 9/1976 | Giallorenzi et al. | 350/347 V X |
| 4,021,099 | 5/1977 | Kawasaki et al. | 350/96.18 |
| 4,102,579 | 7/1978 | Stewart | 350/96.10 X |
| 4,201,442 | 5/1980 | McMahon et al. | 350/96.14 |
| 4,278,327 | 7/1981 | McMahon et al. | 350/347 V |
| 4,385,799 | 5/1983 | Soref | 350/96.19 |
| 4,422,714 | 12/1983 | Benoit | 350/96.15 |
| 4,441,784 | 4/1984 | Korth | 350/96.15 |
| 4,516,837 | 5/1985 | Soref et al. | 350/347 V |
| 4,702,557 | 10/1987 | Beckmann et al. | 350/347 V X |
| 4,711,529 | 12/1987 | Baker | 350/331 R |
| 4,715,684 | 12/1987 | Gagnon | 350/331 R |
| 4,720,171 | 1/1988 | Baker | 350/331 R |
| 4,720,172 | 1/1988 | Baker | 350/347 V X |
| 4,720,174 | 1/1988 | Baker | 350/347 V |
| 4,737,019 | 4/1988 | Baker | 350/347 V |

FOREIGN PATENT DOCUMENTS

| | | | |
|---|---|---|---|
| 2558972 | 8/1985 | France | 350/96.15 |
| 55-6323 | 1/1980 | Japan | 350/96.18 |
| 56-52714 | 5/1981 | Japan | 350/96.20 |
| 60-258505 | 12/1985 | Japan | 350/96.19 |

Primary Examiner—William L. Sikes
Assistant Examiner—Brian M. Healy
Attorney, Agent, or Firm—Robert A. Walsh; Thomas N. Twomey; Mary C. Werner

[57] ABSTRACT

A collimator includes a transparent base member defined by a planar surface and a spherical reflecting surface and includes an opening therein whereby an optical fiber may be terminated in the focal plane of the spherical reflecting surface.

15 Claims, 2 Drawing Sheets

OPTICAL FIBER COLLIMATOR/SWITCH INCLUDING LIQUID CRYSTAL POLARIZING MATERIAL

BACKGROUND OF THE INVENTION

The present invention generally relates to a collimator and, in particular, relates to one such collimator adapted to directly couple to an optical fiber.

The use of optical fibers has been growing in recent years. However, although the usefulness of optical fibers has been amply demonstrated, much work remains to derive the full benefits thereof. For example, one area of difficulty is the physical coupling of an optical fiber to a device or mechanism interacting therewith. Currently, such a coupling is difficult to accomplish and frequently requires elaborate methods and/or devices to ensure the accurate alignment of the optical fibers. One reason for these requisites is that light emanating from an end of an optical fiber immediately begins to disperse. Thus, to promote maximum signal transfer of an optical signal from an optical fiber, a collimating lens, usually a spherical bead lens, is frequently provided, usually at the end of each optical fiber. Likewise, when a light beam is to be coupled into an optical fiber the light beam must be finely focused onto the optical fibers end to avoid considerable light signal losses. The attachment of the fiber end to a collimating lens is currently time consuming to accomplish. As a consequence, the labor costs and expense relating to just the use of a discrete collimating lens often hampers the complete implementation of optical fibers in devices and systems that would clearly benefit therefrom.

One example of a device that would clearly benefit from a less costly optical fiber interconnection is a liquid crystal optical switching device.

Typical of early crystal optical switching device designs are those described and discussed in U.S. Pat. No. 4,201,422 issued on May 6, 1980 to McMahon et al, U.S. Pat. No. 4,278,327 issued on July 14, 1981 to McMahon et al and U.S. Pat. No. 4,385,799 issued on May 31, 1983 to Soref.

More recently, improved liquid crystal optical switching device designs have been described and discussed in co-pending U.S. patent application Ser. Nos: 795,138; 795,148, now U.S. Pat. No. 4,749,258; 795,149, now U.S. Pat. No. 4,711,529; 795,150; 795,151, now U.S. Pat. No. 4,737,019; 795,152, now U.S. Pat. No. 4,720,174, 795,154; 795,155, now U.S. Pat. No. 4,720,171; 795,156; 795,157; and 795,296 all filed on Nov. 5, 1985 and assigned to the assignee hereof. These applications are deemed incorporated herein by reference.

Almost without exception the devices discussed in the above referenced patents and patent applications require at least one collimating lens. In fact, one particular device that overcomes the usual surface mounting complexities, specifically U.S. patent application Ser. No. 795,156 entitled LIQUID CRYSTAL OPTICAL SWITCHING DEVICE, nevertheless, requires, in one embodiment thereof, the use of a spherical collimating lens that is positioned within a blind opening adapted to receive an optical fiber.

Consequently, a collimator, particularly adapted for use with optical fibers as well as devices utilizing optical fibers, that is both inexpensive and readily interconnected with an optical fiber is needed to further the utilization of optical fibers.

SUMMARY OF THE INVENTION

Accordingly, it is one object of the present invention to provide an optical collimator adapted for use with optical fibers.

This object is accomplished, at least in part, by a collimator having means, integral with a transparent member, for collimating a light beam incident thereon.

Other objects and advantages will become apparent to those skilled in the art from the following detailed description read in conjunction with the appended claims and the drawing attached hereto.

DETAILED DESCRIPTION OF THE INVENTION

Figure 1:
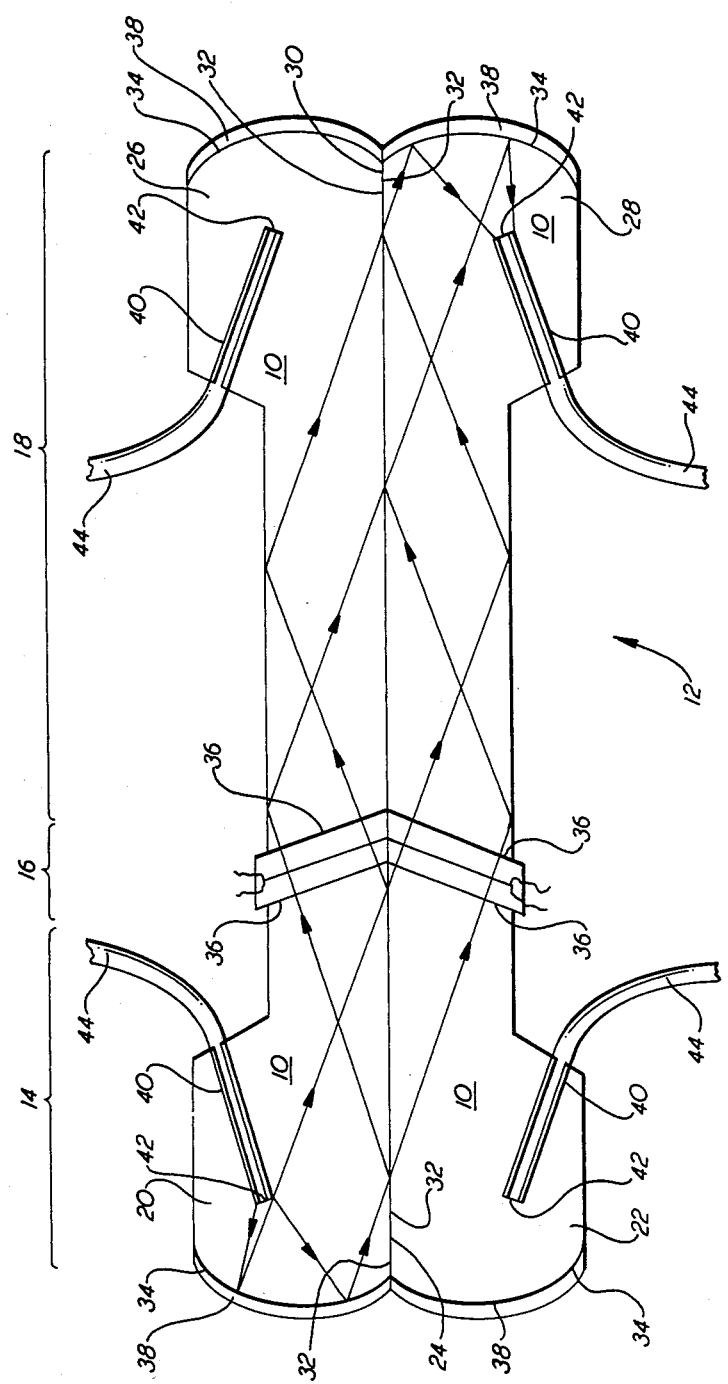
FIG. 1 is a pictorial view, not drawn to scale, of a liquid crystal switching device employing collimators embodying the principles of the present invention.

A typical environment wherein a collimator, generally indicated at 10 in FIG. 1 and embodying the principles of the present invention, is particularly useful is a liquid crystal switching device, generally indicated at 12 in FIG. 1. As used herein, the term "collimated", or the idiomatic equivalents thereof, is generally taken to mean a beam of light that is focused on infinity.

The liquid crystal switching device 12 shown in FIG. 1 includes a beam splitter segment 14, a polarization reorientation segment 16, and a beam recombiner segment 18. The beam splitter segment 14 esentially includes first and second transparent members, 20 and 22, respectively, and a layer 24 of liquid crystal material disposed therebetween. One efficient arrangement to effect the splitting of an incident light beam into the plane polarized components thereof includes a layer 24 of liquid crystal material that is, preferably, nematic and has the molecules thereof homeotropically arrayed. Naturally, other types of liquid crystal material and molecular orientations can also be made to effect the splitting of a light beam into the polarized componemts thereof. The polarization reorientation segment 16 is adapted to selectively and controllably reorient the polarization of the polarized component of the split incident beam passing therethrough. The polarized light beam components, upon exiting the polarization reorientation segment 16, are directed to one or more output ports associated with the beam recombiner segment 18. The beam recombiner segment 18 also generally includes first and second transparent members, 26 and 28, respectively, and a layer 30 of nematic, homeotropically arrayed liquid crystal material disposed therebetween.

One particular design of a liquid crystal switching device 12 and the operation thereof is fully described and discussed in U.S. patent application Ser. No. 913,808 filed on even date herewith and entitled "LIQUID CRYSTAL SWITCHING DEVICE." This application is assigned to the assignee hereof and incorporated herein by reference.

In the present embodiment, each transparent member, 20, 22, 26 and 28, defines a collimator 10 and includes a first planar surface 32 that, in the liquid crystal switching device 10 shown in FIG. 1, is proximate one of the layers, 24 or 30, of liquid crystal material. Each collimator 10 further includes first and second side surfaces, 34 and 36, respectively. In the liquid crystal switching device 12, each second side surface 36 defines a boundary of the polarization reorientation segment 16 whereas each first side surface 34, in such an embodiment, defines a spherical reflecting surface. Preferably, the collimator 10 also includes a layer 38 of reflective material overlying each first side surface 34.

Each collimator 10 further includes a blind opening 40 having a bottom 42 lying in the focal plane of the spherical reflecting surface defined by the first side surface 34 and off-axis thereof. The blind opening 40 is adapted to receive an optical fiber 44 and sized such that the optical fiber 44 may be directly inserted thereinto, preferably, so that the polished end of the fiber 44 abuts the bottom 42. The optical fiber 44 can then be epoxied in place. As the spherical reflecting surface defined, by the first side surface 34, is concave with respect to the incident light beam from the optical fiber 44 the light beam as reflected therefrom, is collimated so long as the optical fiber 44 lies in the focal plane. Preferably, in this embodiment, the bottom 42 of the blind opening 40 is positioned along the focal plane such that the collimated reflected incident light beam strikes the first planar surface 32 at an angle equal to, or greater than, the critical angle. Typically, the blind opening 40 has a diameter on the order of about 130 micrometers, thus, being adapted to accept optical fibers 44 typically having outside diameters on the order of about 125 micrometers.

In the embodiment shown in FIG. 1, the light beam traverses the device 12 in a collimated fashion and strikes the spherical first side surface 34 associated with one of the transparent members, 26 or 28, of the beam recombiner segment 18. The reflected ray from a collimated incident ray focuses in the focal plane of that collimator 10 whereat is located an optical fiber 44 that, in this embodiment, serves as an output port.

In this embodiment, each first side surface 34 and, in fact, each transparent member, 20, 22, 26 and 28, defining a collimator 10, can be initially formed by known plastic molding techniques. The first side surface 34 is thereafter coated by well known techniques, in one embodiment, with one of many well known silver compounds defining the layer 38 of reflective material to increase the reflectivity thereof.

Figure 2:
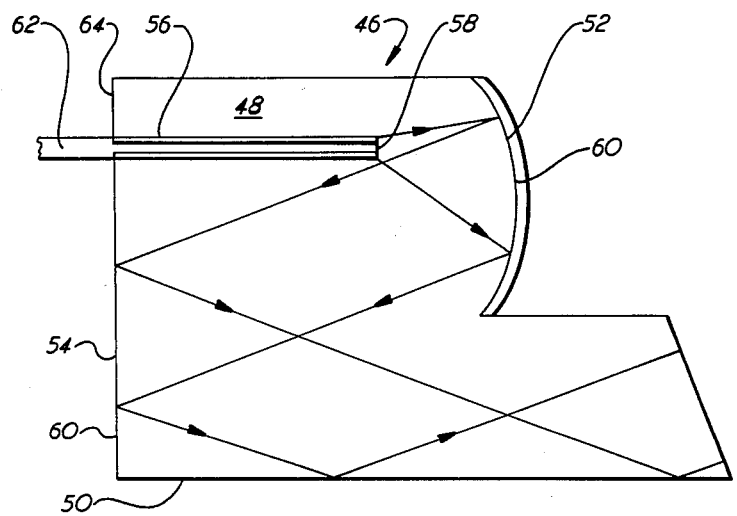
FIG. 2 is a pictorial view, not drawn to scale, of another collimator embodying the principles of the present invention.

A second embodiment of a collimator, generally indicated at 46, is shown in FIG. 2 wherein connection to the collimator 46 is provided from a direction substantially opposite that shown in FIG. 1 but the collimated light beam is effectively, directed in the same manner. In this embodiment, the collimator 46 includes a transparent base member 48 having a planar surface 50. In addition, the base member 48 includes a spherical reflecting surface 52 and a planar reflecting surface 54. The base member 48 further includes a blind opening 56 having a bottom 58 lying in the focal plane of the spherical reflecting surface 52 and off-axis thereof. Preferably, each of the reflecting surfaces, 52 and 54, is provided with a layer 60 of reflective material. When the collimator 46 is adapted for use in a liquid crystal switching device the size and orientation of the reflecting surfaces, 52 and 54, and the blind opening 56 are cooperatively disposed such that a light beam emanating from an optical fiber 62 inserted into the blind opening 56 impinges upon the planar surface 50 at an angle equal to, or greater than, the critical angle thereof. Preferably, in this embodiment, the blind opening 56 extends into the transparent base member 48 from a surface 64 that is coplanar with the planar reflecting surface 54.

Figure 3:
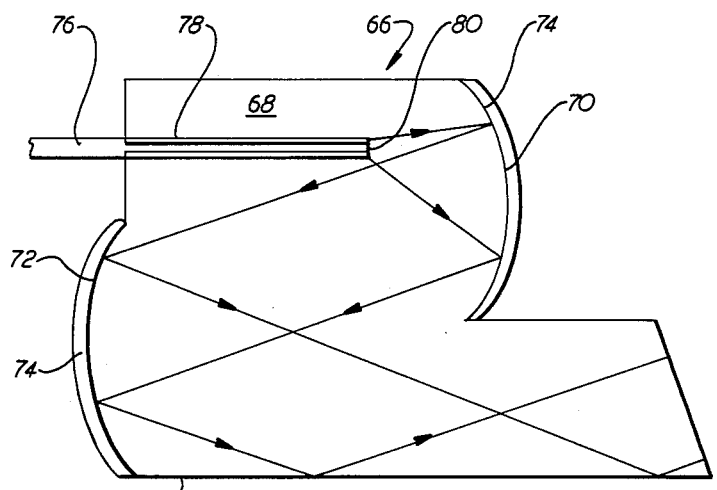
FIG. 3 is a pictorial view, not drawn to scale, of yet another collimator embodying the principles of the present invention.

In another embodiment, a collimator, generally indicated at 66 in FIG. 3 and embodying the principles of the present invention, includes a transparent base member 68 similar to the transparent base member 48 defining the collimator 46 shown in FIG. 2. The transparent base member 68 includes first and second spherical reflecting surfaces, 70 and 72, respectively, each having a layer 74 of reflective material disposed thereover.

Operationally, the collimator 66 receives an optical fiber 76 via a blind opening 78 having a bottom 80 lying in the focal plane of the first spherical reflecting surface 70. Hence, a light beam exiting the optical fiber 76 impinges upon the first spherical reflecting surface 70. The light beam is thus collimated and directed toward the second spherical reflecting surface 72. The light is recollimated by the second spherical reflecting surface 72 and directed toward a planar surface 82 of the transparent base member 68. Preferably, when used in a liquid crystal switching device 12, at an angle equal to, or greater than, the critical angle.

Preferably, the second spherical reflecting surface 72 is provided with a radius of curvature that is substantially greater than the radius of curvature of the first spherical reflecting surface 70. As a result, the collimated light beam is effectively "recollimated" to compensate for any beam divergence introduced by the light beam traversing the path length therebetween through the transparent base member 68.

In one particular implementation, the input collimator 66, the first and second spherical reflecting surface, 70 and 72, respectively, in conjunction with a similar output collimator ensure that the light beam is focused on the end of the output fiber. The particular orientation and, thus effectively, the location of the focal point of the first spherical reflecting surface 70 is determinable by, inter alia, the preferred direction of engaging the optical fiber 76 with the collimator 66. That is, the blind opening 78, without loss of the precise location and sizing thereof, can be oriented to the users convenience and is, for most purposes, dependent upon the desired direction of the entry of the optical fiber 76 into the collimator 66. This can generally be determined beforehand and, as such, the particular orientation of the first and second spherical reflecting surfaces, 70 and 72, respectively, can be ascertained so that the collimator 66 may be mass produced.

The collimator 46 shown in FIG. 2, for the most part, is a simpler device to manufacture for some liquid crystal optical switching devices, or any other optical device. However, the accumulated divergence of a light beam traversing the transparent base member 48 can cause signal losses. Hence, the collimator 66 shown in FIG. 3 is preferred in such devices and in the case of liquid crystal switching devices, in particular, because of the required particular incident angle limitations.

One significant advantage of the collimators, 10, 46, and 66, is that all of the spherical reflecting surfaces, 34, 52, 70 and 72, as well as the planar reflecting surface 54 thereof are single surface reflecting surfaces. Thus, the need for multi-surfaced, e.g. a bead lens, lenses is completely avoided. As a further advantage, such single surfaced reflecting surfaces, when the transparent members are formed from plastic, can be accurately formed during the plastic molding fabrication step thereof. Consequently, considerable time and expense can be saved by avoiding the usual manufacturing steps for providing optically flat glass surfaces.

Although the present invention has been described with respect to particular embodiments other arrangements and configurations may also be developed that, nevertheless, do not depart from the spirit and scope of the present invention. Hence, the present invention is deemed limited only by the appended claims and the reasonable interpretation thereof.

What is claimed is:

1. A collimator comprising:
  a transparent member having a first surface which is planar;
  means, integral with said transparent member, for collimating a light beam incident thereon, said collimating means including a planar reflecting surface directed substantially perpendicularly to said first surface, and a spherical reflecting surface directed substantially opposite said planar reflecting surface, said spherical reflecting surface directing said collimated incident light beam toward said first surface by reflecting said collimated beam off said planar reflecting surface at an angle at laast equal to the critical angle thereof; and
  means for directly coupling an optical fiber to said transparent member adjacent said planar reflecting surface, said direct coupling means terminating in the focal plane of said spherical reflecting surface.

2. Collimator as claimed in claim 1 wherein said optical fiber direct coupling means includes a blind opening, said blind opening extending into said transparent member.

3. Collimator as claimed in claim 1 wherein the bottom of said blind opening lies in the focal plane of said spherical reflecting surface.

4. A collimator comprising:
  a transparent member having a planar surface;
  means, integral with said transparent member, for collimating a light beam incident thereon, said collimating means including a first spherical reflecting surface and a second spherical reflecting surface diagonally opposite said first reflecting surface whereby said collimated incident light beam from said first reflecting surface is recollimated by said second reflecting surface and directed to said planar surface; and
  means for directly coupling an optical fiber to said transparent member adjacent said second spherical reflecting surface, said direct coupling means terminating in the focal plane of said first spherical reflecting surface.

5. Collimator as claimed in claim 4 further comprises, a first layer of reflective material overlying said first reflecting surface.

6. Collimator as claimed in claim 4 further comprises a second layer of reflective material overlying said second reflecting surface.

7. Device as claimed in claim 4 wherein the radius of curvature of said second spherical reflecting surfaces is substantially greater than the radius of curvature of said first spherical reflecting surface.

8. Collimator as claimed in claim 4 wherein said transparent member further includes:
  a second surface, said second surface being planar.

9. Collimator as claimed in claim 8 wherein said second surface is disposed such that a recollimated light beam from said second reflecting surface is incident upon said second surface at an angle at least equal to the critical angle thereof.

10. A liquid crystal switching device comprising:
  a beam splitter segment, said beam splitter segment including first and second transparent members having a first layer of liquid crystal material therebetween whereby a light beam incident upon said layer of liquid crystal material is split into the plane polarized components thereof;
  means, disposed in the path of said polarized components, for selectively reorienting the polarization thereof;
  means, disposed in the path of said polarized components, for redirecting said polarized components;
  a beam recombiner segment, disposed in the path of said redirected polarized components, for recombining said split plane polarized components, said beam recombiner segment including third and fourth transparent members having a second layer of liquid crystal material therebetween;
  means, integral with at least one of said transparent members, for directly coupling with an optical fiber;
  means, defined by said one transparent member, for collimating a light beam incident thereon, said collimating means being a first spherical reflecting surface; and
  means disposed in the path of said collimated light beam for recollimating said collimated light beam, said recollimating means being a second spherical reflecting surface and having a radius of curvature which is longer than the radius of curvature of said first spherical reflecting surface.

11. Device as claimed in claim 10 wherein said optical fiber direct coupling means includes a blind opening extending into said one transparent member, said blind opening having a bottom lying in the focal plane of said first spherical reflecting surface.

12. Device as claimed in claim 10 further comprises:
  a layer of reflecting material overlying said first spherical reflecting surface.

13. Device as claimed in claim 10 wherein said one transparent member includes a planar surface proximate said one of said first or second layers of liquid crystal material, said planar surface being disposed such that said collimated light beam impinges thereupon at an angle at least equal to the critical angle thereof.

14. Device as claimed in claim 13 further comprises:
  a planar reflecting surface defined by said one transparent member, said planar reflecting surface being disposed in the path of said collimated light beam such that said collimated light beam reflected therefrom impinges upon said planar surface at an angle at least equal to said critical angle thereof.

15. Device as claimed in claim 14 wherein said recollimating means second spherical reflecting surface has a layer of reflecting material thereover.

* * * * *